Feb. 16, 1971 — H. S. SMITH ET AL — 3,563,837
SHOCK ABSORBING MAT
Filed Aug. 21, 1968
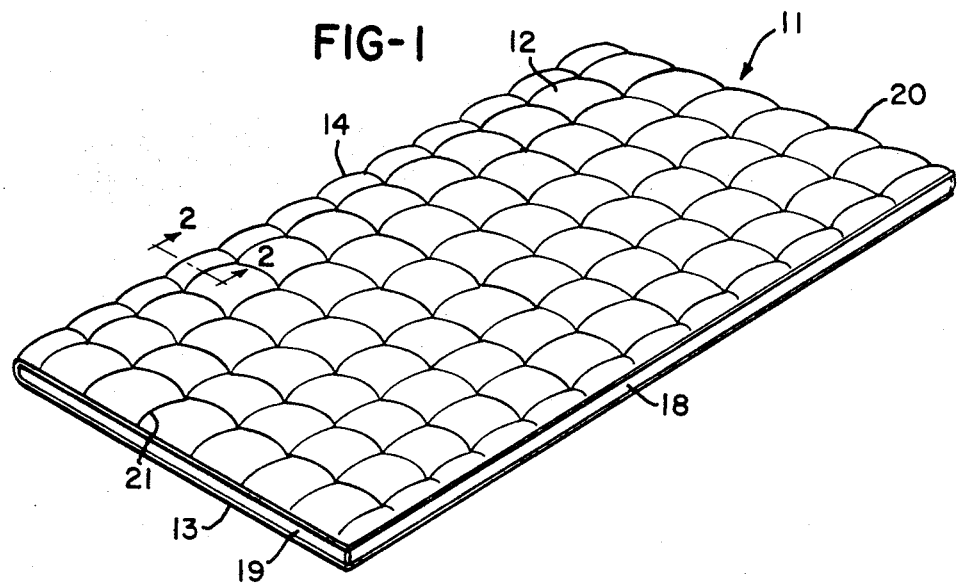
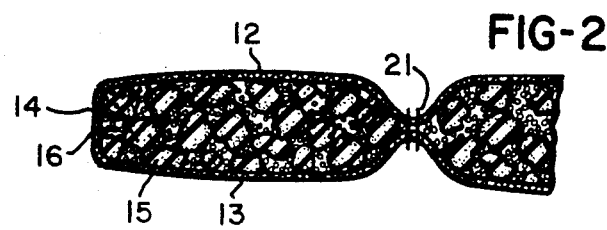
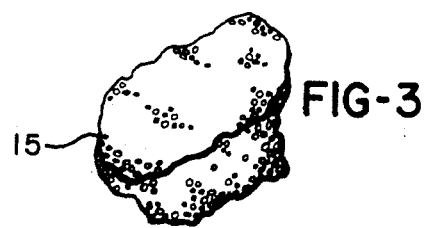
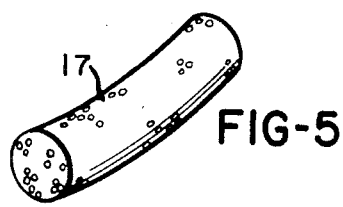
INVENTORS
HOWARD S. SMITH
LELAND E. WILLIAMS
BY Reuben Wolk
ATTORNEY

United States Patent Office 3,563,837
Patented Feb. 16, 1971

3,563,837
SHOCK ABSORBING MAT
Howard S. Smith, Asheville, and Leland E. Williams, Waynesville, N.C., assignors to Dayco Corporation, Dayton, Ohio, a corporation of Delaware
Filed Aug. 21, 1968, Ser. No. 754,432
Int. Cl. B32b 3/00, 5/16
U.S. Cl. 161—43                                6 Claims

ABSTRACT OF THE DISCLOSURE

A shock-absorbing mat in which a cover is filled with a mixture of small pieces of flexible elastomeric foam material, such as latex or urethane, and semi-rigid plastic foam material, such as expanded styrene or urethane.

---

This invention relates to shock-absorbing mats comprising a cover filled with pieces of flexible elastomeric foam material, such as rubber latex or urethane foam, and additional particles having a different type of shock-absorbing quality. The mat not only has excellent shock-absorbing properties, but is also light in weight, economical to manufacture, and is germ and mildew resistant. The additional particles are made of semi-rigid plastic foam materials, such as expanded styrene beads or segments, or urethane foam. The flexible pieces and semi-rigid particles are loosely retained within the covers, which are formed into compartments in order to prevent the pieces or particles from sliding about within the covers to cause lumping in some areas and hollow spots in others.

The present invention represents an improvement over prior art devices, such as conventional gymnasium mats that are made of canvas or heavy duck fabric and filled with felt, goat hair, cotton batting, or similar material. More recently, vinyl covers have replaced the canvas or duck. These prior art mats have proved to be inadequate for many reasons. First of all, such mats provide a proper cushioning effect only when they are new, but as soon as they are used a few times the filling material packs down so that there is virtually no cushioning effect. Secondly, these mats are breeding grounds for germs which seize on the nearest patch of bruised skin as a transfer point, thereby increasing possibility of infection. Thirdly, the conventional mats are so heavy that it takes two people to move them and four people to stack them.

The present invention provides a solution to all these problems. The foamed materials used in the novel mat provide a better cushioning because the materials tend to spring back, rather than take a permanent compression. It has been found that unexpectedly high shock-absorbing properties are developed by a combination of the flexible elastomeric foam materials and the semi-rigid materials, which have the further advantage of lowering the density of the filling material. The semi-rigid particles may crush under extremely high loads, but this absorbs the heaviest shocks. These particles are so intermixed with the other foam pieces that the crushing is very minor. The filling materials used are highly resistant to germ growth, and therefore are more sanitary. The weight of the mat is much lower because of the combined low density pieces and particles.

The mats manufactured in accordance with the present invention may be used as indoor gym mats, as for tumbling, high jumping, or broad jumping; or may be used for outdoor track events, such as pole-vaulting, by stacking several of these mats upon each other. The principle may also be applied to such uses as football tackling dummies, where the same properties are desirable.

The invention is illustrated in the drawings, in which:
FIG. 1 is a perspective view of a typical mat embodying the present invention.
FIG. 2 is an enlarged sectional view, taken along line 2—2 of the mat, illustrating the interior arrangement of the filling materials.
FIG. 3 is an enlarged perspective view of a typical flexible elastomeric piece.
FIGS. 4 and 5 are enlarged perspective views of typical semi-rigid foam particles.

Referring to the drawings, FIG. 1 illustrates a mat 11 manufactured in accordance with the invention. The cover of the mat consists of either canvas, vinyl, or similar materials and originally is formed of a large sheet which is laid in an open position and subsequently folded over into the position shown so that the upper member 12 and the lower member 13 are parts of the same sheet with the fold taking place around the end 14. After the filling material is placed within the cover, the opposite end 18 and the ends 19 and 20 are sewed, taped, or cemented shut to make a completely closed body. The filling material which is laid within the cover consists of pieces 15 of the flexible latex foam rubber, urethane foam, or combinations of both, all ground into a fairly course size approximately one-half inch in diameter such as shown in FIG. 3. Intermixed with these pieces are particles 16 or 17 which are made of a semi-rigid plastic foam material such as expanded styrene or urethane. These particles are in the form of beads 16 having a diameter of about .060 to .500 in diameter, or in the form of cylindrical strands 17 similar to spaghetti, having roughly the same diameter. The beads 16 are illustrated in FIG. 4 and the strands 17 in FIG. 5. Any combination of beads and strands may be mixed with the flexible foam pieces in a weight ratio of anywhere between 5 to 200 parts of semi-rigid particles per 100 parts of flexible foam pieces. It should be noted that these pieces and particles are all loose and it is especially desired to maintain them in an unbonded condition in order to allow them to move about freely within their compartments.

After these pieces and particles have been placed within the sheets and the ends sewn together as described, the entire assembly is placed in a quilting machine and longitudinal and transverse quilting stitches 21 are applied in such a manner that there will be resultant squares of about six to ten inches per side. The quilted squares will thus secure the mixed pieces and particles in place so that they will not be shifted about under impact as would occur if the entire mat were left unquilted. At the same time, the fact that these pieces and particles are not bonded to each other permits them to be shifted about sufficiently to avoid packing and flattening. The resultant product has the advantages set forth above and thus provides an improved cushioning effect along with sanitation and lightness in weight. In lieu of quilting, it is also possible to form these compartments by other sewing methods which are known to the bedding industry.

Other modifications in the basic form of the invention described are also feasible within the scope of the invention.

What is claimed is:
1. A shock-absorbing mat comprising upper and lower covers and filling material consisting of a loose mixture of flexible elastomeric foam pieces and semi-rigid plastic foam particles, and a plurality of compartments extending between said upper and lower covers, each of said compartments retaining some of said material.
2. The mat of claim 1 having 5 to 200 parts by weight of said particles pere 100 parts by weight of said pieces.

3. The mat of claim 1 in which said particles are selected from the group consisting of expanded styrene and semi-rigid urethane.

4. The mat of claim 1 in which said pieces are selected from the group consisting of foam rubber and urethane foam.

5. The mat of claim 1 in which said pieces are foam rubber.

6. The mat of claim 1 in which said pieces are urethane foam.

References Cited

UNITED STATES PATENTS

| | | | |
|---|---|---|---|
| 2,882,327 | 4/1959 | Roberts | 260—723 |
| 3,242,508 | 3/1966 | Smithson | 161—160 |
| 3,405,674 | 10/1968 | Coates et al. | 161—50 |

WILLIAM J. VAN BALEN, Primary Examiner

U.S. Cl. X.R.

5—334; 112—420; 161—120, 159, 161, 162